United States Patent
Ham et al.

(10) Patent No.: US 11,271,225 B2
(45) Date of Patent: Mar. 8, 2022

(54) THERMAL-ACTIVATED PRESSURE RELIEF DEVICE FOR FUEL CELL VEHICLE

(71) Applicants: Hyundai Motor Company, Seoul (KR); KIA Motors Corporation, Seoul (KR)

(72) Inventors: Jeong Hyun Ham, Jeonju-si (KR); Yong Joo Cho, Seoul (KR); Ki Ho Hwang, Seoul (KR); Jae Han Chung, Incheon (KR)

(73) Assignees: Hyundai Motor Company, Seoul (KR); KIA Motors Corporation, Seoul (KR)

(*) Notice: Subject to any disclaimer, the term of this patent is extended or adjusted under 35 U.S.C. 154(b) by 194 days.

(21) Appl. No.: 16/582,753

(22) Filed: Sep. 25, 2019

(65) Prior Publication Data
US 2020/0365917 A1     Nov. 19, 2020

(30) Foreign Application Priority Data
May 17, 2019   (KR) .................. 10-2019-0057897

(51) Int. Cl.
*F16K 17/38*     (2006.01)
*F17C 13/04*     (2006.01)
(Continued)

(52) U.S. Cl.
CPC ......... *H01M 8/04089* (2013.01); *F16K 17/38* (2013.01); *F16K 17/383* (2013.01);
(Continued)

(58) Field of Classification Search
CPC . H01M 8/04089; H01M 8/065; F17K 17/383; F17K 17/38; Y02E 60/50;
(Continued)

(56) References Cited

U.S. PATENT DOCUMENTS 4,744,382 A * 5/1988 Visnic ................... F16K 17/003
                                                                    137/68.23
4,899,777 A    2/1990 Stone et al.
(Continued)

FOREIGN PATENT DOCUMENTS

EP       0807557 A1    11/1997
JP       2771144 B2     7/1998
(Continued)

OTHER PUBLICATIONS

JP-2004270809-A_English_Translation_of_Specification.pdf (Year: 2021).*

(Continued)

*Primary Examiner* — Mary E McManmon
*Assistant Examiner* — Stephanie A Shrieves
(74) *Attorney, Agent, or Firm* — Morgan, Lewis & Bockius LLP

(57) ABSTRACT

The present disclosure provides a thermal-activated pressure relief device of a fuel cell vehicle, the thermal-activated pressure relief device including: a hollow body mounted at an outlet of a hydrogen tank; a hydrogen discharge block having a plurality of first hydrogen discharge holes and mounted and fixed in an upper portion of the hollow body; a hydrogen discharge pipe having a plurality of second hydrogen discharge holes and connected to a bottom of the hydrogen discharge block; a piston fitted on an outer side of the hydrogen discharge pipe to be able to move up and down and to open and close the second hydrogen discharge holes; a stopper mounted in a lower portion of the hollow body and limiting a downward movement distance of the piston; and a melting alloy disposed between the piston and the stopper and melting at a predetermined temperature or more.

9 Claims, 5 Drawing Sheets

(51) Int. Cl.
  *H01M 8/04089* (2016.01)
  *H01M 8/065* (2016.01)

(52) U.S. Cl.
  CPC .............. *H01M 8/065* (2013.01); *F17C 13/04* (2013.01); *F17C 2205/0317* (2013.01); *F17C 2205/0332* (2013.01); *F17C 2205/0338* (2013.01); *F17C 2205/0382* (2013.01); *F17C 2221/012* (2013.01); *F17C 2223/036* (2013.01); *F17C 2270/0168* (2013.01); *F17C 2270/0184* (2013.01)

(58) Field of Classification Search
  CPC .. Y02E 60/32; B60L 50/70; F17C 2205/0382; F17C 2205/0338; F17C 2221/012; F17C 2205/0332; F17C 2270/0184; F17C 13/04; F17C 2223/036; F17C 2205/0317; F17C 2270/0168; F17C 2223/0123; F17C 2205/0391; F17C 2205/0314; Y10T 90/40
  USPC ...................................... 137/72, 73
  See application file for complete search history.

(56) References Cited

U.S. PATENT DOCUMENTS

| | | | | | |
|---|---|---|---|---|---|
| 5,144,973 | A | * | 9/1992 | Green | F16K 17/40 137/513.3 |
| 5,511,576 | A | * | 4/1996 | Borland | F16K 17/383 137/72 |
| 5,632,297 | A | * | 5/1997 | Sciullo | F16K 17/383 137/72 |
| 5,762,091 | A | * | 6/1998 | Sarne | F16K 17/383 137/74 |
| 5,791,367 | A | * | 8/1998 | Hackman | F16K 17/383 137/74 |
| 5,941,269 | A | | 8/1999 | Ingle | |
| 6,367,499 | B1 | * | 4/2002 | Taku | F16K 17/383 137/72 |
| 7,814,925 | B2 | * | 10/2010 | Nomichi | F16K 17/383 137/72 |
| 9,371,913 | B2 | | 6/2016 | Lhymn et al. | |
| 9,945,489 | B2 | * | 4/2018 | Daido | F16K 17/383 |
| 2005/0150548 | A1 | * | 7/2005 | Kita | F16K 17/383 137/72 |
| 2008/0276992 | A1 | | 11/2008 | Nomichi et al. | |
| 2009/0038687 | A1 | * | 2/2009 | Kremer | F16K 17/383 137/74 |

FOREIGN PATENT DOCUMENTS

| | | | |
|---|---|---|---|
| JP | 2004-270809 | | 9/2004 |
| JP | 2004270809 A | * | 9/2004 |
| JP | 2009058088 A | * | 3/2009 |
| JP | 2009058088 A | | 3/2009 |
| JP | 2011117543 A | | 6/2011 |

OTHER PUBLICATIONS

JP-2009058088-A_English_Translation_of_Specificaiton.pdf (Year: 2021).*

* cited by examiner

THERMAL-ACTIVATED PRESSURE RELIEF DEVICE FOR FUEL CELL VEHICLE

CROSS-REFERENCE TO RELATED APPLICATION

This application claims priority to and the benefit of Korean Patent Application No. 10-2019-0057897, filed May 17, 2019, which is incorporated herein by reference in its entirety.

FIELD

The present disclosure relates to a thermal-activated pressure relief device of a fuel cell vehicle and, more particularly, to a thermal-activated pressure relief device of a fuel cell vehicle, the thermal-activated pressure relief device being able to forcibly discharge hydrogen in a hydrogen tank for safety at a predetermined temperature or more.

BACKGROUND

The statements in this section merely provide background information related to the present disclosure and may not constitute prior art.

A fuel cell system that is mounted on a hydrogen fuel cell vehicle includes a fuel cell stack that generates electrical energy, a hydrogen supplier that supplies hydrogen that is fuel to the fuel cell stack, an air (oxygen) supplier that supplies air (oxygen), which is an oxidizer in an electrochemical reaction, to the fuel cell stack.

The hydrogen supplier, as shown in FIG. 1, includes a hydrogen tank 10, a solenoid valve 11 mounted at the outlet of the hydrogen tank 10 and controlling inflow and outflow of hydrogen, a temperature-activated pressure relief device 12 (referred to as 'TPRD') mounted at the outlet of the hydrogen tank 10 together with the solenoid valve 11 to forcibly discharge hydrogen to the outside when the temperature of the hydrogen tank 10 increases, a regulator 13 reducing the pressure of hydrogen that is supplied from the hydrogen tank 10 to the fuel cell stack 20, etc.

Hydrogen is stored in the hydrogen tank 10 of the hydrogen supplier by a method of compressing and storing high-pressure hydrogen, and the Maximum Allowable Working Pressure (MAWP) is set up to 875 bar when storing hydrogen to increase the storage amount of the hydrogen in the hydrogen tank 10. Accordingly, safety requirements for high-pressure hydrogen stored in hydrogen tanks have been enhanced.

For this reason, the TPRD 12 is employed as a kind of thermal-activated pressure relief device and has a function of forcibly discharging hydrogen and pressure in the hydrogen tank when the temperature of the hydrogen tank increases to a predetermined temperature of more in preparation for the possibility that if a fire occurs in a fuel cell vehicle, temperature is increased by flames and the internal pressure of the hydrogen tank 10 is increased, thereby causing the hydrogen tank 10 to explode.

As the TPRD, in the related art, there are a metal melting/spring type TPRD and a glass bulb TPRD.

If a fire, etc. occurs in a fuel cell vehicle and a hydrogen tank and the surrounding increase in temperature over a reference temperature due to flames, the metal melting/spring type TPRD of the related art operates through a process in which a fusible alloy melts, a process in which the force pressing a spring is removed and a supporting rod is moved forward by the elastic restoring force of the spring, a process in which the piston is unlocked by the forward movement of the supporting rod, and a process in which the piston is moved to open a hydrogen discharge path by the internal pressure of a hydrogen tank.

Accordingly, hydrogen and pressure in the hydrogen tank are forcibly discharged to the atmosphere through the open hydrogen discharge path.

In a metal melting/spring type TPRD, the spring is strongly compressed to lock the piston with large pressure (e.g., 700 bar) applied to the piston from the hydrogen tank and the elastic restoring force of the spring is applied to the fusible alloy. However, indium and bismuth that are the main materials of the fusible alloy are relatively soft metals, so the fusible alloy cannot resist tension of the spring and explodes, whereby there is a possibility of malfunction of the TPRD.

Additionally, the path through which the fusible alloy is discharged and the hydrogen discharge path are separated from each other, so the structure is complicated and a large number of parts are used.

On the other hand, a glass bulb TPRD of the related art includes a hollow body connected to a hydrogen tank, an exhaust cap coupled to an outer end of the hollow body, a piston fastened in the hollow body, and a glass bulb disposed between the exhaust cap and the piston.

In particular, liquid that expands at a predetermined temperature or more is kept in the glass bulb.

Accordingly, if a fire, etc. occurs in a fuel cell vehicle and a hydrogen tank and the surrounding increases in temperature over a reference temperature due to flames, the liquid in the glass bulb overheats and expands, so the glass bulb explodes. Accordingly, the piston is moved forward by the internal pressure of the hydrogen tank, whereby an exhaust hole of the exhaust cap opens and hydrogen in the hydrogen tank is forcibly discharged through the exhaust hole of the exhaust cap.

However, with a glass bulb TPRD, there is a possibility that the TPRD may generate a malfunction such as unexpected forcible discharge of hydrogen if the glass bulb is easily broken by external shock.

In addition, when a separate protective part is added to increase shock resistance of the glass bulb, the machining design of the TPRD is changed by addition of the protective part, so the number of parts increase and the assembly processes increase, thereby increasing the manufacturing cost and the possibility of defects.

The above information disclosure in this Background section is only for enhancement of understanding of the background of the present disclosure, and therefore it may contain information that does not form the prior art that is already known to a person of ordinary skill in the art.

SUMMARY

The present disclosure provides, in one aspect, a thermal-activated pressure relief device of a fuel cell vehicle, the thermal-activated pressure relief device enabling downsizing and reduction of the number of parts in comparison to existing TPRDs, being able to smoothly perform the fundamental function of a TPRD, and being able to improve durability and safety and prevent or inhibit a malfunction due to strong resistance against external shock and vibration.

The present disclosure provides a thermal-activated pressure relief device of a fuel cell vehicle, the thermal-activated pressure relief device including: a hollow body mounted at an outlet of a hydrogen tank; a hydrogen discharge block having a plurality of first hydrogen discharge holes and mounted and fixed in an upper portion of the hollow body; a hydrogen discharge pipe having a plurality of second hydrogen discharge holes and connected to a bottom of the hydrogen discharge block; a piston fitted on an outer side of the hydrogen discharge pipe to be able to move up and down and to open and close the second hydrogen discharge holes; a stopper mounted in a lower portion of the hollow body and limiting a downward movement distance of the piston; and a melting alloy disposed between the piston and the stopper and melting at a predetermined temperature or more.

A first female threaded portion may be formed in an upper portion of the hollow body and a first male threaded portion thread-fastened to the first female threaded portion may be formed on an outer side of the hydrogen discharge block.

The first hydrogen discharge holes may be vertically formed through the hydrogen discharge block and arranged with regular intervals along a circumferential edge of the hydrogen discharge block.

The hydrogen discharge pipe may be a pipe with an open lower portion and may be integrally formed on a bottom inside the first hydrogen discharge holes of the hydrogen discharge block.

The second hydrogen discharge holes may be formed laterally through the hydrogen discharge pipe and arranged with regular intervals around the hydrogen discharge pipe.

The stopper may have a second male threaded portion on an outer side thereof to be thread-fastened to a second female threaded portion formed on an inner side of the lower end portion of the hollow body, and may have a third hydrogen discharge hole formed at a center thereof.

A plurality of tool insertion holes for thread-fastening the stopper may be formed on an outer side of the stopper.

An O-ring and a backup ring for hermetically keeping hydrogen may be disposed on an outer side of the piston.

The melting alloy may be a low-melting point alloy of non-lead materials, may keep in close contact with the piston on the stopper when temperature is less than a predetermined level, and may be melted and discharged outside due to downward movement of the piston by discharge pressure of hydrogen when temperature is the predetermined level or more.

The present disclosure provides the following effects from the configuration described above.

First, it is possible to enable downsizing and reduction of the number of parts in comparison to existing TPRDs and to smoothly perform the fundamental function of a TPRD that forcibly discharges the pressure and hydrogen in a fuel tank to the outside at a predetermined temperature or more.

Second, the thermal-activated pressure relief device is strong against external shock and vibration, unlike an existing glass bulb type, so durability and stability can be improved and a malfunction can be inhibited.

Third, the thermal-activated pressure relief device can be used as a safety device for forcibly discharging gas not only in a hydrogen tank, but in LPG, CNG, LNG tanks, etc.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawing in which.

Figure 1:
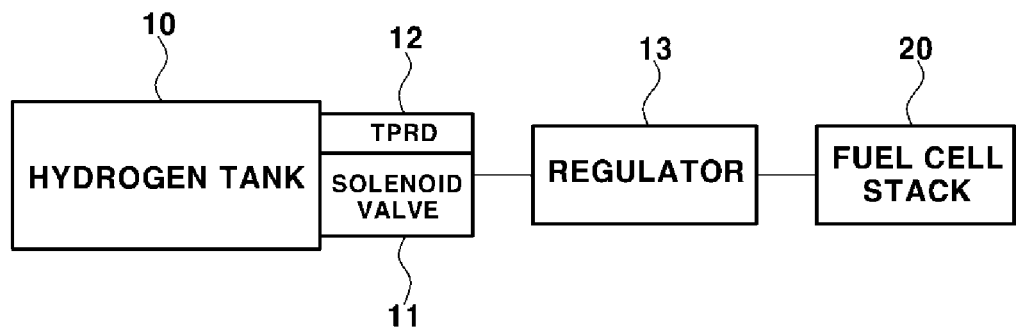
FIG. 1 is a block diagram showing a hydrogen supplier of a fuel cell vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, forms of the present disclosure will be described in detail with reference to the accompanying drawings.

Figure 2:
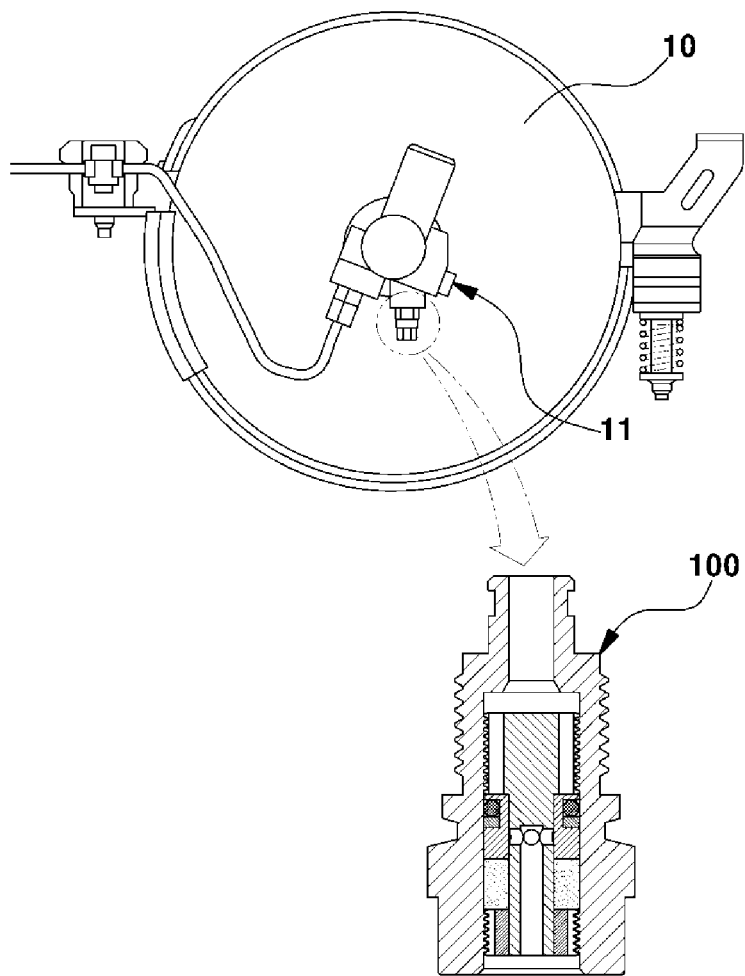
FIG. 2 is a schematic view showing an installation position of a TPRD of a fuel cell vehicle according to the present disclosure.

FIG. 2 is a schematic view showing an installation position of a TPRD of a fuel cell vehicle according to the present disclosure, in which reference numeral '10' indicates a hydrogen tank.

A solenoid valve 11 for allowing or stopping hydrogen from being supplied to a fuel cell stack is mounted at an outlet of the hydrogen tank 10 and a temperature-activated pressure relief valve, that is, a TPRD 100 receiving the internal pressure of the hydrogen tank 10 is mounted close to the solenoid valve 11.

The TPRD 100 has a function of forcibly discharging hydrogen and pressure in the hydrogen tank when the temperature of the hydrogen tank increases to a predetermined temperature of more in preparation for the possibility that if a fire occurs in a fuel cell vehicle, temperature is increased by flames and the internal pressure of the hydrogen tank 10 is increased, thereby exploding the hydrogen tank 10.

Figure 3:
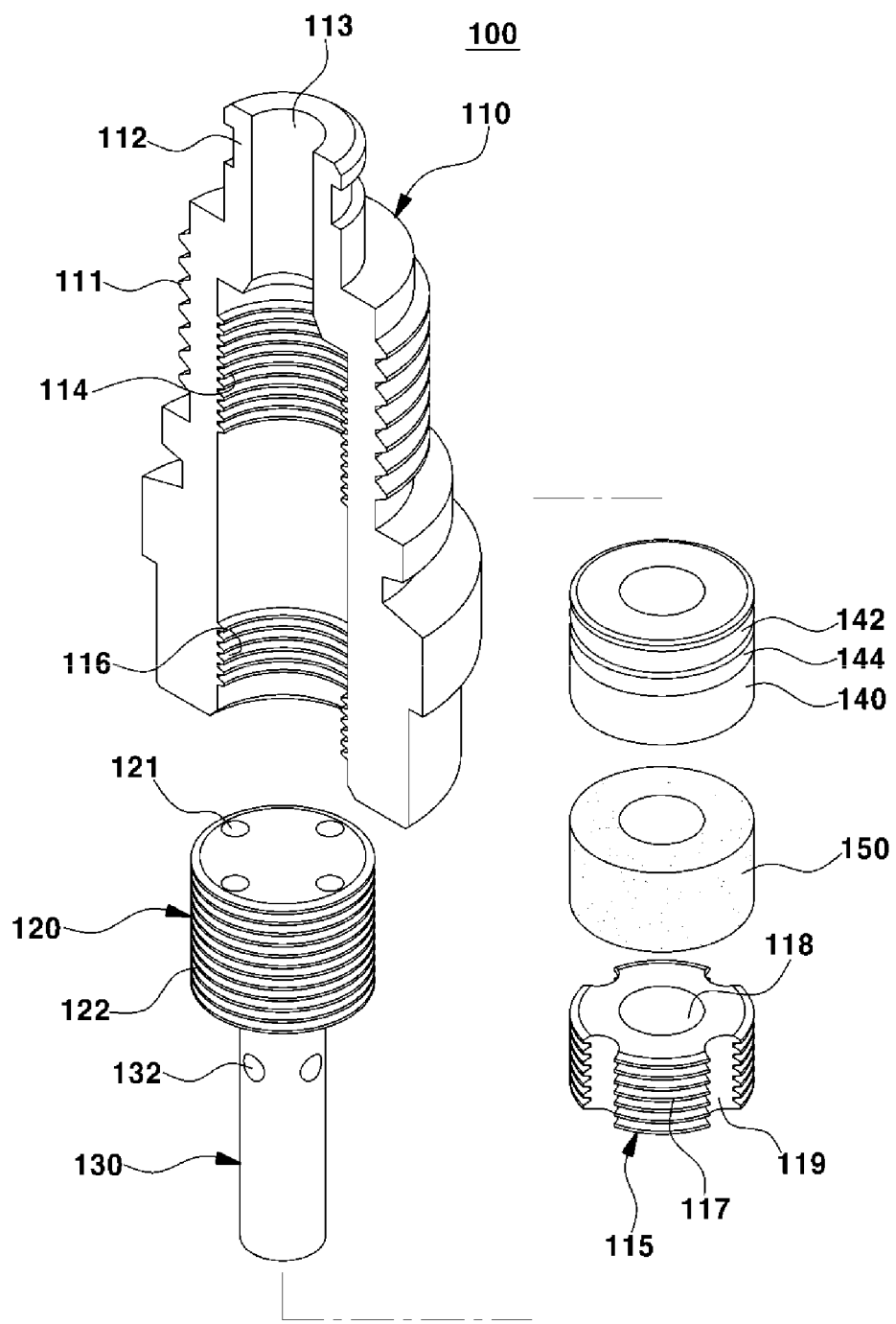
FIG. 3 is an exploded perspective view of a TPRD according to the present disclosure.
Figure 4:
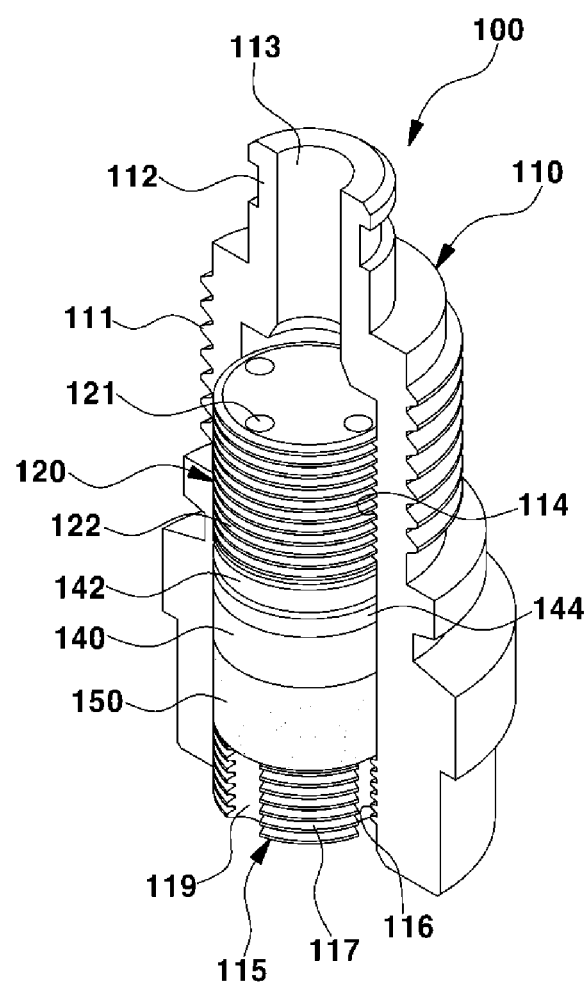
FIG. 4 is an assembly perspective view of a TPRD according to the present disclosure.

FIGS. 3 and 4 are perspective views respective before and after a TPRD according to the present disclosure is assembled.

The hollow body 110, which is a part forming the frame of the TPRD 100 according to the present disclosure, is mounted close to the solenoid valve 11 mounted at the outlet of the hydrogen tank 10.

To this end, a thread 111 for fastening adjacent to the solenoid valve 11 is formed on the outer side of the upper portion of the hollow body 110.

Further, a protrusive pressure inlet end 112 is formed at the upper end of the hollow body 110 and a pressure action hole 113 that communicates with the inside of the hydrogen tank is formed in the pressure inlet end 112, so the internal pressure of the hydrogen tank is applied to the pressure action hole 113.

In particular, a first threaded portion 114 is formed on the inner side of the upper portion of the hollow body 110 and a stopper 115 is disposed in the lower portion of the hollow body 110.

A hydrogen discharge block 120, a hydrogen discharge pipe 130, a piston 140, and a melting alloy 150 are inserted in the hollow body 110 and then the stopper 115 is inserted in the lower end portion of the hollow body 110, thereby supporting the melting alloy 150.

To this end, the stopper 115 has a second male threaded portion 117 on the outer side to be thread-fastened to a second female threaded portion 116 formed on the inner side of the lower end portion of the hollow body 110, and has a third hydrogen discharge hole 118 vertically formed through the center thereof.

Further, a plurality of tool insertion holes 119 for thread-fastening the stopper 115 is vertically formed on the outer side of the stopper 115.

The hydrogen discharge block 120 has a plurality of first hydrogen discharge holes 121 and is fixed in the upper portion of the hollow body 110.

To this end, a first male threaded portion 122 that is treaded-fastened to the first female threaded portion 114 of the hollow body 110 is formed on the outer side of the hydrogen discharge block 120.

The first hydrogen discharge holes 121 are vertically formed through the hydrogen discharge block 120 and arranged with regular intervals along the circumferential edge of the hydrogen discharge block 120.

Accordingly, the first male threaded portion 122 of the hydrogen discharge block 120 is thread-fastened to the first female threaded portion 114 of the hollow body 110, whereby the hydrogen block 120 is coupled to the hollow body 110 and the first hydrogen discharge holes 121 of the hydrogen discharge block 120 communicate with the pressure action hole 113 of the pressure inlet end 112.

The hydrogen discharge pipe 130 has a plurality of second hydrogen discharge holes 132 and is integrally connected to the bottom of the hydrogen discharge block 120.

In more detail, the hydrogen discharge pipe 130, which is a pipe with an open lower portion, has an upper end integrally connected to the bottom inside the first hydrogen discharge holes 121 of the hydrogen discharge block 120, that is, a portion of the bottom of the hydrogen discharge block 120 where the first hydrogen discharge holes 121 are not formed.

The second hydrogen discharge holes 132 are formed laterally through the hydrogen discharge pipe 130 and arranged with regular intervals around the hydrogen discharge pipe 130.

The piston 140 has a hole at the center to be fitted on the outer side of the hydrogen discharge pipe 130 to be movable up and down.

Further, an O-ring 142 and a backup ring 144 for hermetically keeping hydrogen are disposed on the outer side of the piston 140.

Accordingly, when the piston 140 is fitted on the outer side of the hydrogen discharge pipe 130, the inner side of the piston 140 closes the second hydrogen discharge holes 132 of the hydrogen discharge pipe 130 and hydrogen flowing inside through the first hydrogen discharge holes 121 of the hydrogen discharge block 120 from the pressure action hole 113 of the pressure inlet end 112 is blocked by the O-ring 142 and the backup ring 144.

The fusion metal 150 is a low-melting point alloy of non-lead materials for satisfying environmental regulations and is inserted in the hollow body 110 in close contact with the bottom of the piston 140.

As described above, the hydrogen discharge block 120, the hydrogen discharge pipe 130, the piston 140, and the melting alloy 150 are inserted in the hollow body 110 and then the stopper 115 that supports the melting alloy 150 is inserted in the lower end portion of the hollow body 110.

That is, the second male threaded portion 117 of the stopper 115 is thread-fastened to the second female thread portion 116 formed on the inner side of the lower end portion of the hollow body 110, in which a tool is inserted in the tool insertion holes 119 formed on the outer side of the stopper 115 and applies torque, whereby the stopper 115 can be easily fastened.

Accordingly, the melting alloy 150 is disposed between the piston 140 and the stopper 115.

That is, the melting alloy 150 is disposed between the piston 140 and the stopper 150 with the bottom supported by the stopper 115 and the top in close contact with the bottom of the piston 140. Accordingly, the melting alloy 150 keeps in close contact with the piston 140 by being supported by the stopper 115 when temperature is less than a predetermined level, and is melted and discharged outside due to downward movement of the piston 140 by discharge pressure of hydrogen when temperature is the predetermined level or more.

The operational flow of the TPRD having this configuration of the present disclosure is described hereafter.

Figure 5:
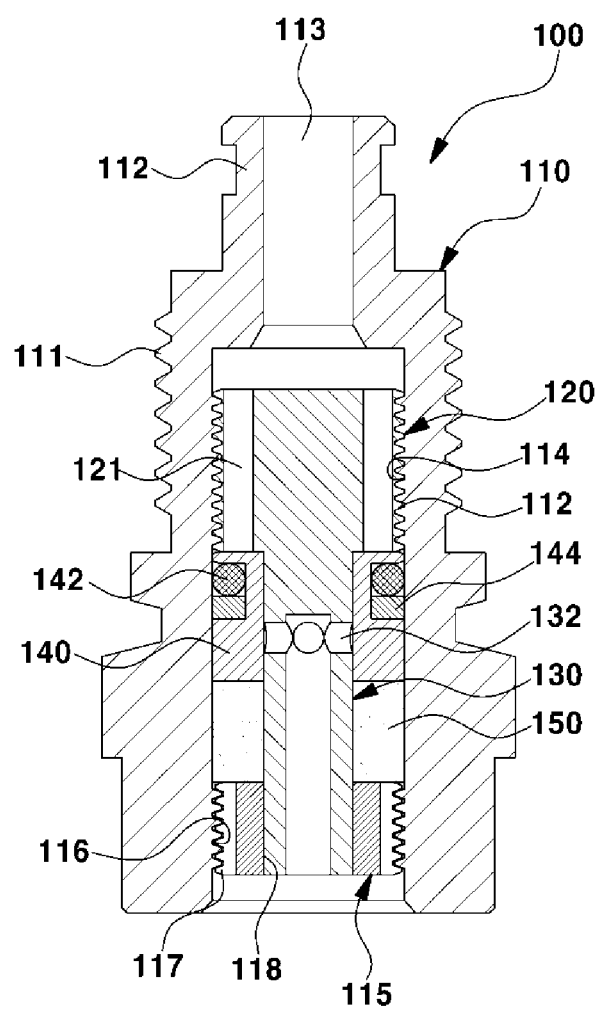
FIG. 5 is a cross-sectional view showing the state before the TPRD according to the present disclosure operates.
Figure 6:
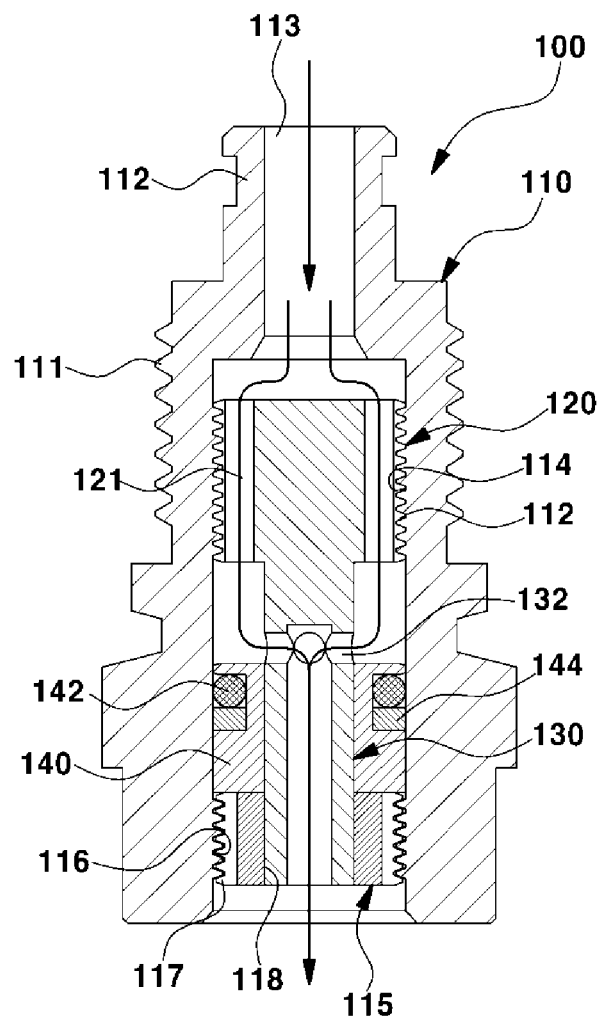
FIG. 6 is a cross-sectional view showing the state after the TPRD according to the present disclosure operates.

FIGS. 5 and 6 are cross-sectional views showing the states before and after the TPRD according to the present disclosure operates.

First, the melting alloy 150 keeps in close contact with the piston 140 by being supported by the stopper 115 when the temperature is less than a predetermined level.

Further, the piston 130 keeps fitted on the hydrogen discharge pipe 130 and the inner side of the piston 140 keeps closing the second hydrogen discharge holes 132 of the hydrogen discharge pipe 130.

Further, even though the pressure transmitted inside through the first hydrogen discharge holes 121 of the hydrogen discharge block 120 from the pressure action hole 113 of the pressure inlet end 112 that communicates with the inside of the hydrogen tank is applied to the top of the piston 140, the piston 140 is not moved down because the melting alloy 150 being in close contact with the bottom of the piston 140 is supported and locked by the stopper 115, as shown in FIG. 5.

Further, the hydrogen flowing inside through the first hydrogen discharge holes 121 of the hydrogen discharge block 120 from the pressure action hole 113 of the pressure inlet end 112 that communicates with the inside of the hydrogen tank is blocked by the O-ring 142 and the backup ring 144, so hydrogen embrittlement of the melting alloy 150 disposed under the piston 140 can be inhibited.

If a fire occurs in a fuel cell vehicle in this state and temperature increases over the predetermined level due to flames, the melting alloy 150 melts.

In this case, since the melting alloy 150 has been melted and unlocked from the stopper 115, when the internal pressure of the hydrogen tank is applied to the top of the piston 140 through the first hydrogen discharge holes 121 of the hydrogen discharge block 120 from the pressure action hole 113 of the pressure inlet end 112, the piston 140 is moved down.

Further, the piston 140 presses the molten melting alloy 150 while moving down, the molten melting alloy 150 is discharged outside through the third hydrogen discharge hole 118 and the tool insertion holes 119 of the stopper 115 and through a lower outlet of the hollow body 110. Further, the second hydrogen discharge holes 132 of the hydrogen discharge pipe 130 are opened by downward movement of the piston 140.

The downward movement distance of the piston 140 is limited until the bottom of the piston 140 reaches the top of the stopper 115.

Accordingly, the pressure and the hydrogen in the hydrogen tank pass through the pressure action hole 113 of the pressure inlet end 112 and the first hydrogen discharge holes 121 of the hydrogen discharge block 120 and then enter the hydrogen discharge pipe 130 through the second hydrogen discharge holes 132, which are open, of the hydrogen discharge pipe 130. Further, the pressure and the hydrogen pass through the third hydrogen discharge hole 118 of the stopper 115 that communicates with the lower open portion of the hydrogen discharge pipe 130 and is then easily forcibly discharged outside through the lower outlet of the hollow body 110.

On the other hand, the hydrogen discharge block 120 is thread-fastened to keep firmly fixed in the upper portion of the hollow body 110 even under the internal pressure (about 700 bar) of the hydrogen tank and the stopper 115 is also thread-fastened to keep firmly fixed in the lower portion of the hollow body 110 even under the internal pressure (about 700 bar) of the hydrogen tank. Accordingly, the piston 140 and the melting alloy 150, which are operation parts disposed between the hydrogen discharge block 120 and the stopper 115, easily keep locked without moving in normal times.

As described above, the hydrogen discharge block 120 and the stopper 115 are firmly mounted in the hollow body 110 to be able to resist the internal pressure of the hydrogen tank, and the piston 140 and the melting alloy 150 disposed between the hydrogen discharge block 120 and the stopper 115 easily keep locked without moving in normal times. Accordingly, as described above, it is possible to easily inhibit a malfunction of the TPRD due to rupture of a spring in existing metal melting/spring type TPRDs or a malfunction of a TRRD due to breaking of a glass bulb by external shock in an existing glass bulb type TPRD.

As described above, the TPRD according to the present disclosure enables downsizing and reduction of the number of parts in comparison to existing TPRDs and is able to smoothly perform the fundamental function of a TPRD that forcibly discharges the pressure and hydrogen in a fuel tank to the outside at a predetermined temperature or more. Further, the TPRD according to the present disclosure is strong against external shock and vibration, unlike existing spring types and glass bulb types, so durability and stability can be improved and a malfunction can be inhibited.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the present disclosure.

What is claimed is:

1. A thermal-activated pressure relief device of a fuel cell vehicle, the thermal-activated pressure relief device comprising:
   a hollow body mounted at an outlet of a hydrogen tank;
   a hydrogen discharge block having a plurality of first hydrogen discharge holes and mounted and fixed in an upper portion of the hollow body;
   a hydrogen discharge pipe having a plurality of second hydrogen discharge holes and connected to a bottom of the hydrogen discharge block;
   a piston fitted on an outer side of the hydrogen discharge pipe to be able to move up and down and to open and close the plurality of first hydrogen discharge holes and the plurality of second hydrogen discharge holes;
   a stopper mounted in a lower portion of the hollow body and limiting a downward movement distance of the piston; and
   a melting alloy disposed between the piston and the stopper and melting at a predetermined temperature or more such that when the melting alloy is melted and unlocked from the stopper, the internal pressure of the hydrogen tank is applied to the top of the piston through the first hydrogen discharge holes of the hydrogen discharge block and the piston is moved down.

2. The thermal-activated pressure relief device of claim 1, wherein a first female threaded portion is formed in an upper portion of the hollow body and a first male threaded portion thread-fastened to the first female threaded portion is formed on an outer side of the hydrogen discharge block.

3. The thermal-activated pressure relief device of claim 1, wherein the first hydrogen discharge holes are vertically formed through the hydrogen discharge block and arranged with regular intervals along a circumferential edge of the hydrogen discharge block.

4. The thermal-activated pressure relief device of claim 1, wherein the hydrogen discharge pipe is a pipe with an open lower portion and is integrally formed on a bottom inside the first hydrogen discharge holes of the hydrogen discharge block.

5. The thermal-activated pressure relief device of claim 1, wherein the second hydrogen discharge holes are formed laterally through the hydrogen discharge pipe and arranged with regular intervals around the hydrogen discharge pipe.

6. The thermal-activated pressure relief device of claim 1, wherein the stopper has a second male threaded portion on an outer side thereof to be thread-fastened to a second female threaded portion formed on an inner side of the lower portion of the hollow body, and has a third hydrogen discharge hole formed at a center thereof.

7. The thermal-activated pressure relief device of claim 6, wherein a plurality of tool insertion holes for thread-fastening the stopper is formed on an outer side of the stopper.

8. The thermal-activated pressure relief device of claim 1, wherein an O-ring and a backup ring for hermetically keeping hydrogen are disposed on an outer side of the piston.

9. The thermal-activated pressure relief device of claim 1, wherein the melting alloy is a low-melting point alloy of non-lead materials, keeps in close contact with the piston on the stopper when temperature is less than a predetermined level, and is melted and discharged outside due to downward movement of the piston by discharge pressure of hydrogen when temperature is the predetermined level or more.

* * * * *